Jan. 3, 1967 A. D. CARTER ET AL 3,295,507
LUBRICATION SYSTEM FOR INTERNAL COMBUSTION ENGINES
Filed July 6, 1964
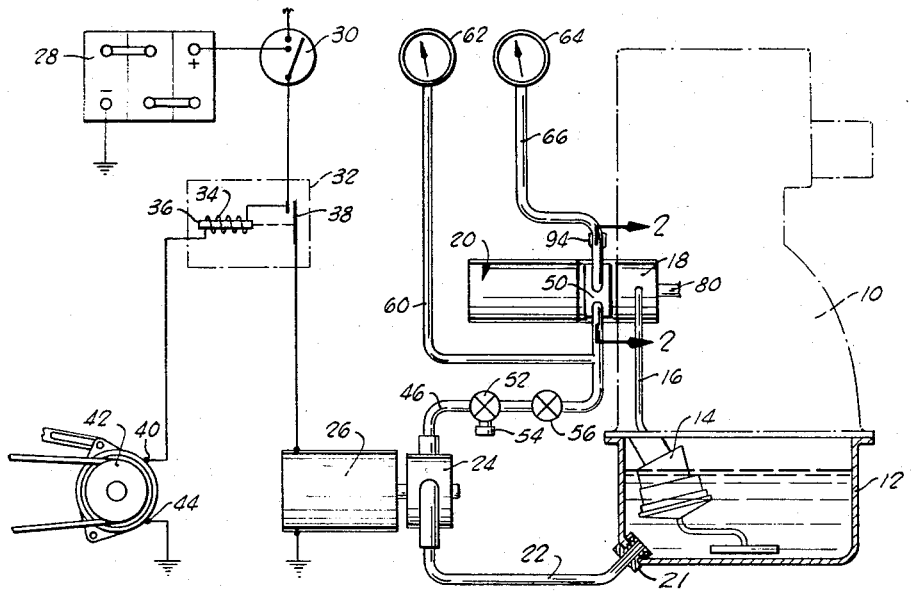
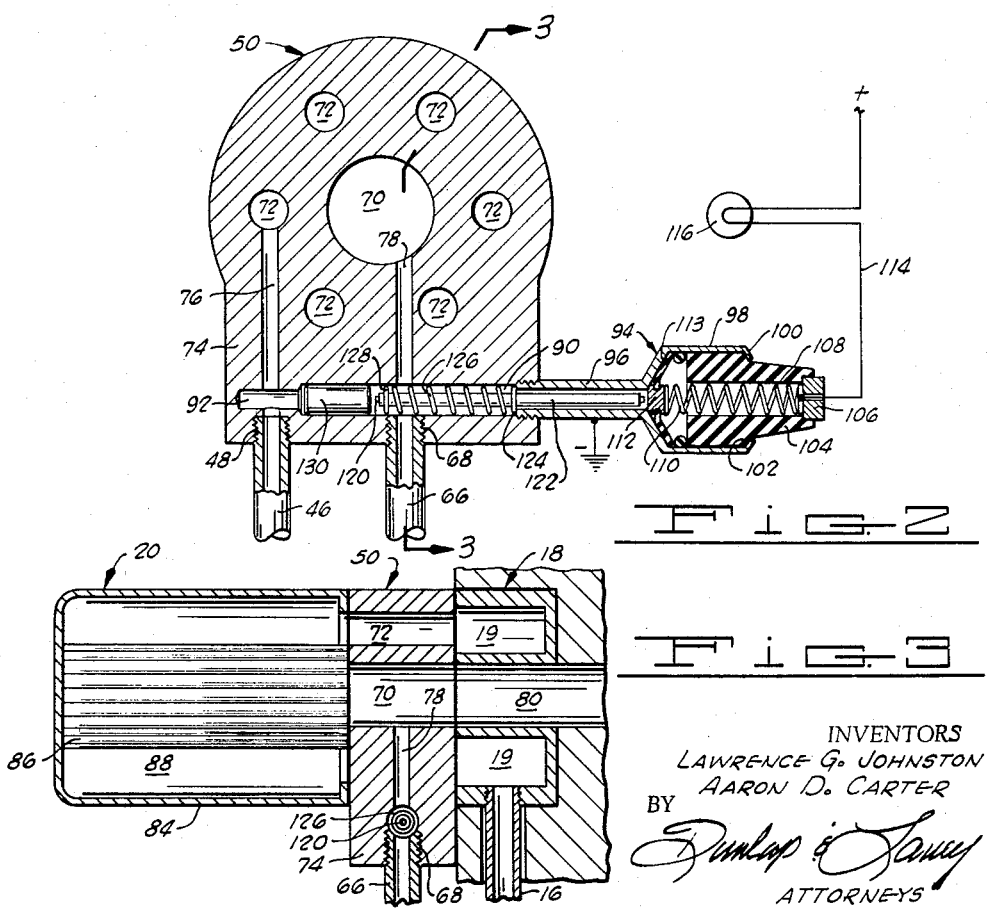
INVENTORS
LAWRENCE G. JOHNSTON &
AARON D. CARTER
BY
*Dunlap & Laney*
ATTORNEYS

United States Patent Office 3,295,507
Patented Jan. 3, 1967

3,295,507
LUBRICATION SYSTEM FOR INTERNAL
COMBUSTION ENGINES
Aaron D. Carter, 1608 NW. 45th, Oklahoma City, Okla. 73111, and Lawrence G. Johnston, P.O. Box 68, Nicoma Park, Okla. 73066
Filed July 6, 1964, Ser. No. 380,262
12 Claims. (Cl. 123—196)

This invention relates to a system for lubricating internal combustion engines. More particularly, the present invention relates to a system for lubricating the moving parts of an internal combustion engine so that lubrication is provided prior to starting the engine, and is continuously maintained during operation of the engine in a manner which assures constant operator appraisal of the state of cleanliness of the filter used to filter the lubricant used in the system.

A great many systems have previously been proposed for pre-lubricating an internal combustion engine prior to the time that the engine is started. The need for such pre-lubrication systems arises from the fact that the moving parts and bearings associated with the engine do not generally receive adequate lubrication from the engine driven lubricant pump until several power strokes of the engine have occurred. In the interim period prior to this time, the dry state of moving parts which are in contact with each other results in heavy wear and reduces their effective service life to an undesirable extent. In general, the pre-lubrication systems which have been heretofore proposed include an auxiliary lubricant pump which, in many instances, is electrically powered from the battery used to start the internal combustion engine. The systems proposed also generally contain suitable means for de-energizing or shutting off the auxiliary lubricant pump after the engine driven lubricant pump has become primed and is pumping an adequate supply of lubricant to the moving parts of the engine.

Several problems have been characteristic of internal combustion engine pre-lubricating systems previously proposed. One of these problems has been that of providing an adequate means for draining the lubricant from the oil sump or reservoir. In some instances, this problem is aggravated by the fact that the line by which the lubricant is carried from the oil sump of the engine to the lubricant pump is connected through the drain plug normally provided in the oil sump and thus renders drainage of the lubricant from the engine impossible without the concurrent disconnection of the auxiliary lubricant pump.

Another problem which has been characteristic of some of the pre-lubrication systems previously provided is that of connecting the auxiliary lubricant pump to the oil gallery of the engine so as to supply the lubricant during the pre-lubrication period to the various locales within the engine requiring lubrication. This has required the provision of special fittings, or the drilling of holes in the engine block, or similar operations which are time-consuming, and in some cases, expensive.

Yet another disadvantage of some pre-lubrication systems which have been heretofore proposed is their failure to provide for proper filtration of oil circulated through the pre-lubrication system to the engine so that any residual materials contained in the oil in the sump of the engine are passed directly to the oil gallery and high abrasion of moving parts within the engine will occur as a result of the circulation of dirty oil therethrough. Where an attempt has been made to filter the oil delivered during the pre-lubrication period, this has usually required the provision of another filter in addition to the main filter used for filtering oil passed to the engine from the main lubrication pump.

The present invention provides a novel lubrication system for internal combustion engines which includes an efficient pre-lubrication system and an effective filtration unit for filtering both (a) the oil directed to the engine by the pre-lubrication system, and (b) the oil pumped by the standard engine driven lubricant pump. The pre-lubrication system is particularly well-adapted for attachment to existing automobile internal combustion engines of the type having a filter secured to the engine block with a minor amount of alteration or structural change being required in order to use the existing filter for filtering oil circulated through the pre-lubrication system, as well as oil delivered by the conventional lubricant pump of the engine. In the system of the present invention, means is also provided for easily and quickly draining lubricant from the sump of the engine without reliance upon gravity drainage and using the auxiliary pump of the pre-lubrication system for removing substantially all of the lubricant from the system. A further advantage of the present invention over pre-lubrication systems of the type heretofore proposed is that means is provided for constantly indicating to an operator of the internal combustion engine the state of cleanliness of the lubricant filter so that the filter may be quickly changed at such time as it ceases to perform efficiently.

Broadly described, though without being limited by such description, the present invention comprises an auxiliary, electrically driven pump adapted to be powered by a conventional storage battery and electrically wired to permit shut-off or de-energization at such time as the internal combustion engine with which the system is used has attained a predetermined operating speed; a filter downstream from the auxiliary pump and adapted to receive lubricant from either the auxiliary pump or from the main lubricant pump driven by the internal combustion engine; means connected to the filter and responsive to the porosity of the filter for developing a signal indicative of the cleanliness of the filter; and means disposed between the auxiliary pump and the filter for draining the lubricant from the sump of the engine without reliance upon gravity drainage. In a preferred embodiment of the invention, the system further includes a novel adapter fitting which permits the lubricant filters now in general use on gasoline engines of the type used in automobiles to be used in the system of the invention with a minor amount of structural modification or expense involved in such use.

From the foregoing description of the invention, it will be perceived that a major object of the present invention is to provide an improved lubrication system for internal combustion engines.

Another object of the invention is to provide an effective pre-lubrication system which is capable of continuously delivering an adequate supply of clean lubricant to the engine until the conventional, main lubricant pump associated with the engine and driven thereby has been primed and is functioning to deliver a sufficient quantity of lubricant to the engine.

An additional object of the present invention is to provide a pre-lubricating system which can be used in association with the types of gasoline engines now in use in automobiles so as to make use of the lubricant filters now utilized with such engines.

Yet another object of the present invention is to provide a pre-lubrication system for internal combustion engines which includes as a salient feature thereof, means for positively pumping all of the lubricant from the lubricant sump of the engine through a discharge port so that the oil can be removed from the engine without reliance upon gravity drainage.

An additional object of the present invention is to provide an effective signalling system for indicating to an operator of an internal combustion engine the state of cleanliness of the lubricant filter associated with the engine so that such filter may be replaced or cleaned before becoming blocked and by-passed by the lubricant to introduce corrosive or abrasive materials to the moving parts of the engine.

Yet another object of the present invention is to provide a lubrication system for internal combustion engines which is relatively inexpensive to manufacture, is mechanically sturdy and is characterized by a long and trouble-free operating life.

Another object of the invention is the provision of a pre-lubrication system for an internal combustion engine which provides a single, common filter for filtering lubricant delivered by either the auxiliary prelubricant pump or by the main engine driven pump.

In addition to the foregoing described objects and advantages of the invention, other objects and advantages will become apparent as the following detailed description of the invention is read in conjunction with the accompanying drawings which illustrate our invention.

In the drawings:

FIGURE 1 schematically illustrates one embodiment of the present invention as the same may be utilized in conjunction with an internal combustion engine of the type used in automobiles;

FIGURE 2 is a sectional view taken along line 2—2 of FIGURE 1; and

FIGURE 3 is a sectional view taken along line 3—3 of FIGURE 1.

Referring now to the drawings in detail, and particularly to FIGURE 1, reference character 10 designates an internal combustion engine, a portion of which is schematically illustrated in phantom in FIGURE 1. A lubricating oil sump or reservoir 12 is located beneath the engine and receives lubricant after it has been circulated through the engine in contact with the various moving parts thereof. The engine usually includes, as a part of the original, built-in equipment associated therewith, a main lubricant pump 14 which is driven by the engine when the engine is in operation. A lubricant delivery conduit 16 extends from the main lubricant pump 14 to a lubricant manifold 18 positioned within the engine block and containing an annular chamber 19 (see FIGURE 3) which is filled with lubricant during operation of the engine.

In the gasoline engines used in many contemporary automobile models, a lubricant filter 20 is connected to the engine block adjacent the lubricant manifold 18 and receives lubricant directly therefrom. The same filter 20 can be used in the novel combination of the present invention, and its position in the system and details of its structure will be discussed in greater detail hereinafter.

Connected to the bottom of the lubricant sump 12, and conveniently connected through the drain plug 21 which is normally provided in association with the sump, is a feed conduit 22 which is connected at its other end to a positive displacement auxiliary pump 24. A suitable electric motor 26 is drivingly connected to the auxiliary pump 24 and is powered by a storage battery 28 or other available and convenient source of electrical energy. In the preferred embodiment of the invention illustrated in FIGURE 1, the battery is connected to the motor 26 through a suitable switch, such as the ignition switch 30 of the automobile and through a relay designated generally by reference character 32. The relay 32 includes a coil 34 and soft iron core 36 and a normally open switch 38. The other end of the coil 34 of relay 32 is connected to one terminal 40 of the generator 42 of the automobile. A second terminal 44 of the generator is grounded in the conventional manner, and the circuitry thus depicted is such that when the ignition switch is closed, the relay 32 is energized by the making of an electrical circuit through the coil 34 of the relay and through the generator 42 to ground. Energization of the relay 32 closes the normally opened switch 38 to complete an electrical circuit from the battery through the electric motor 26 to ground.

Lubricant is discharged from the auxiliary pump 24 through a conduit 46 to an injection port 48 provided in a filter adapter 50 (see FIGURE 2). The conduit 46 contains a two-way drain valve 52 which permits lubricant to be diverted from the conduit 46 through a drain port 54 in one position of the valve. A check valve 56 is provided in the conduit 46 between the two-way drain valve 52 and the filter adapter 50 for preventing retrograde flow of lubricant from the filter toward the auxiliary pump 24 when the auxiliary pump is not in use. A pressure line 60 branches from the conduit 46 and is connected to a pressure gauge 62 for providing an indication of the pressure of lubricant upstream from the filter 20 in a manner and for a purpose hereinafter described. A second pressure gauge 64 is connected by a tubular line 66 to a discharge port 68 in the filter adapter 50 in the manner illustrated in FIGURE 2.

The manner in which the novel filter adapter 50 and the filter 20 are mounted on the engine 10 and used in the lubrication system of the present invention can be better understood by referring to FIGURES 2 and 3 which illustrate details of the adapter and filter. The filter adapter 50 is a generally cylindrical metallic block which has a large central bore 70 and a plurality of small ports 72 extending parallel to each other and to the central bore 70 and disposed in an annular ring around the central bore 70 in circumferentially spaced relation to each other. The filter adapter further has a built-up portion 74 on one side thereof which is provided with an intake passageway 76 placing one of the ports 72 in communication with the injection port 48 and a discharge passageway 78 placing the central bore 70 in communication with the discharge port 68. When the filter adapter is mounted on the engine block opposite the lubricant manifold 18, the small ports 72 are aligned with the annular manifold chamber 19 so that lubricant from the chamber 19 can pass via the ports 72 into the filter 20. The large central bore 70 of the filter adapter 50 is aligned with the central chamber (hereinafter described) of the filter 20, and with a passageway 80 extending through the lubricant manifold 18 and the engine block to the oil gallery (not seen) of the engine.

The filter adapter 50 can be secured to the engine block in any suitable manner, but preferably makes use of the existing connections provided on many contemporary models of gasoline engines used in automobiles and provided for the purpose of attaching the oil filter 20 to the engine block. In other words, the filter adapter 50 is provided with fittings for engaging the filter 20 with the engine block at the point of connection provided on the original equipment for securing the lubricant filter to the engine, and the lubricant filter is then secured to the opposite side of the filter adapter. In this way, the existing lubricant filters which are currently provided may be employed in the system of the present invention without alteration and with no structural change required in the engine block.

The structural characteristics commonly present in lubricant filters of the type used in association with automobile engines are illustrated in FIGURE 3. In general, the filter 20 comprises a metallic cylindrical outer shell 84 and a porous cylindrical corrugated filter element 86 positioned concentrically within the outer shell so as to define an annulus 88 therebetween. The porous corrugated filter element 86 encloses a large cylindrical void located at the center of the filter into which the lubricant passes as it is strained through the filter element during circulation. Lubricant then flows from the interior of the filter element 86 to the large central bore 70 of the filter adapter 50 and into the passageway 80 in the engine block which leads to the oil gallery.

Before proceeding to the description of a specific preferred embodiment of the present invention which includes certain novel structure in addition to that which has been hereinbefore described, it is believed that the best interest of the reader in understanding the operation of the present invention will be served by discussing the operation of the basic system hereinbefore described.

As hereinbefore indicated, it is highly desirable to afford positive lubrication of the various moving parts of the engine under superatmospheric pressure at a time prior to the commencement of actual operation of the engine. Mechanical engineers have estimated that as much as 70 percent of the total wear which is experienced by these parts during the service life of the engine occurs during the short interval of time between the time the engine is started and the time by which lubricant has been delivered by the main pump 14 to the lubricated parts. Although this time interval may sometimes be as short as twenty seconds, the undesirable practice of many drivers of starting the engine and immediately accelerating it to high speeds greatly aggravates the wear which occurs at parts which cannot be properly lubricated until the main pump 14 has become primed and has delivered lubricant through the filter to the oil gallery and to the moving parts of the engine.

In using the system of the present invention, the operator turns the ignition switch to the "on" position, but does not close the switch which closes the circuit to the starter. In more recent automobiles, the ignition key is used to actuate both switches with the key being turned to a first position to close the circuit from the battery to the spark plugs of the engine and to a second position to close the circuit to the starter to turn the engine over. In the simplified diagrammatic arrangement of FIGURE 1, reference character 30 indicates simply the switch which is closed by the ignition key in the first position to close the circuit to the battery without closing the starter circuit. Thus, when the operator turns the ignition key to close the switch 30, an electrical circuit is made from the storage battery 28 through the coil 34 of relay 32 through the generator 42 to ground. Energization of the relay 32 closes the switch 38 which makes an electrical circuit through the electric motor 26. The motor is thus energized to drive the auxiliary pump 24. Lubricant is, therefore, pumped from the lubricant sump 12 of the engine 10 through the conduit 22 and through the conduit 46 to the filter adapter 50. In the filter adapter 50, the lubricant passes through the intake passageway 76 to one of the ports 72 and is introduced via this port to the annular space 88 in the filter 20. The lubricant then passes through the filter element 86 to the interior of the filter and is thus filtered to remove any small suspended particles of sludge, grit or other corrosive or abrasive particles.

Lubricant which has been passed through the filter element 86 next passes through the large central bore 70 and the passageway 80 to the oil gallery and is distributed from this point to various parts of the engine which are to be lubricated. After the auxiliary pump 24 has been allowed to run for a short period of time, say, about one minute, the starter switch is closed by the operator to start the engine. By this time, all of the moving parts of the engine will have been bathed in lubricant and the lubricant pressure within the engine will have been built up to a suitable level by the auxiliary pump 24. Upon starting the engine, the main pump 14 is also started and will perform its conventional function of delivering lubricant through the lubricant manifold 18 and filter 20 to the oil gallery of the engine. Lubricant which enters the lubricant manifold 18 passes through the ports 72 of the filter adapter 50 to the annular space 88 of the filter and then follows the same path into the engine as that which is followed by lubricant delivered initially by the auxiliary pump 24. As the engine is accelerated to a higher speed, the generator 42 is also driven at a faster rate, which results in the development of a back or bucking E.M.F. in the electrical circuit which contains the relay 32. When the opposing E.M.F. developed by the generator equals or exceeds the E.M.F. developed by the battery 28, current will cease to flow in the electrical circuit from the battery through the relay to the generator in the direction which causes the relay to be energized. Thus, in its normal function of charging the battery 28, the generator, in the system of the present invention, performs the additional function of de-energizing the relay 32 so as to open switch 38 and break the electrical circuit to the electric motor 26.

As the lubricant flows through the ports 72 to the filter 20, whether the source of the lubricant be the auxiliary pump 24, or the main pump 14, the pressure within the annulus 88 and therefore within the ports 72 is transmitted through the conduit 60 to the pressure gauge 62 so that the operator may be apprised of the pressure of the lubricant upstream from the filter 29. The pressure downstream from the filter 20 is indicated by the pressure gauge 64 as a result of its connection through the conduit 66 and discharge port 78 to the large central bore 70 in the filter adapter 50. It will be recalled that this bore is in communication with the interior of the filter element 86 and with the passageway 80 in the engine block. It will thus be perceived that by comparison of the pressure gauges 62 and 64, the operator is constantly apprised of the pressure drop across the filter element 86 and this pressure drop will provide an accurate and continuous indication of the state of cleanliness of the filter element. At such time as the difference in pressure between the readings of gauges 62 and 64 exceeds a certain predetermined magnitude, the operator will know that the filter 20 should be replaced, or that the filter element 86 should be cleaned.

It is, of course, necessary to periodically remove the lubricant utilized in the engine 10 and replace the old lubricant with fresh clean lubricant. Frequently, this change is made at the time that the filter 20 is replaced, or the element 86 is cleaned or renewed. To facilitate removing the lubricant from the sump 12 of the engine 10, a two-way drain valve 52 and a drain port 54 are provided in the conduit 46. When the valve 52 is moved to a position such that the drain port 54 is placed in communication with the auxiliary pump 24, the auxiliary pump may be actuated in the manner hereinbefore described to pump the lubricant from the sump 12 to the conduit 46 and out of the port 54. The positive displacement auxiliary lubricant pump 24 can effectively remove substantially all of the lubricant from the sump 12 and performs this function substantially more expeditiously than lubricant can be removed from the sump by gravity drainage as is now conventional practice with most internal combustion engines.

A useful and novel modification of the basic system hereinbefore described is depicted in FIGURE 2 of the drawings. As indicated in FIGURE 2, the built-up portion 74 of the filter adapter 50 is traversed over a major portion of its transverse thickness by a passageway which includes a relatively large bore 90 and a smaller counterbore 92. The enlarged bore 90 and counterbore 92 intersect and communicate with the passageways 78 and 76, respectively. The large bore 90 is internally threaded at its outer end to receive a threaded fitting designated generally by reference character 94 which includes a relatively small diameter tubular portion 96 and an enlarged housing 98. The enlarged housing 98 is provided with an annular lip 100 which engages a shoulder 102 formed on a spring retaining element 104. The spring retaining element 104 is constructed of an electrically insulating material and receives and supports an electrical terminal block 106. An axial passageway 108 is provided in the spring retaining element 104 and receives a helical spring 110 which is electrically connected to the electrical terminal block 106 at one of its ends and to a metallic electrical contact element 112 at its other end. The electrical terminal block 106 is connected by a wire 114 to a small light 116 located on the dashboard of the automobile, or may be connected to any other type of electrical circuit for the purpose of controlling lubricant flow, sounding an alarm or performing some other function as hereinafter described. The small diameter tubular portion 96 of the fitting 94 is electrically grounded to permit the electrical circuit which includes the light 116 and wire 114 to be completed therethrough as will be hereinafter explained. The electrical contact 112 is centrally positioned and supported within the enlarged housing 98 by a flexible diaphragm 113 which may be constructed of rubber or some other suitable resilient material which is an electrical insulator.

Disposed in part within the tubular portion 96 of fitting 94 and in part within the enlarged bore 90 in the filter adapter 50 is an elongated solid cylindrical metallic rod designated by reference character 120. The metallic rod 120 is constructed of a metal which is a good electrical conductor and is surrounded over a major portion of its length by rubber or a suitable electrically insulating plastic material 122. The end of the tubular portion 96 of fitting 94 which is screwed into the threaded bore 90 of the built-up portion 74 of the adapter 50 forms a radially inwardly projecting shoulder 124 which serves as a stop or abutment retaining against axial movement in the bore 90 a helical spring 126. The helical spring 126 is coiled around the metallic rod 120 and its sheath 122 of insulating material and terminates adjacent a spring retainer plate 128 which is keyed to the insulating material 122 at a point adjacent the innermost end of the rod 120. The spring retainer plate 128 is preferably also constructed of an electrically insulating material.

At the innermost end of the enlarged bore 90, a metallic free-floating piston 130 is disposed in the enlarged bore and is positioned adjacent the shoulder formed by the juncture between the counterbore 92 and the bore 90. The piston is freely slidable in the bore 90, but is dimensioned to maintain electrical contact with the walls of the bore 90 in order to function in the manner hereinafter described.

In effect, the threaded fitting 94, bore 90, spring 126, metallic rod 120 and free-floating piston 130 comprise a compound, hydraulically actuated differential pressure switch, the function of which will next be described. During normal operations of the internal combustion engine 10, oil will circulate freely from the annular space 88 of the filter 20 through the filter element 86, and from the center of the filter through the central bore 70 of the filter adapter 50 to the passageway 80 leading to the lubricant gallery of the engine. During such normal operation, a certain differential pressure will exist across the filter element 86 and this will correspond substantially to the differential pressure existing between the intake passageway 76 and the discharge passageway 78 in the filter adapter 50.

Before either the engine or auxiliary pump 24 are initially started, there is no positive pressure on the lubricant in the filter 20 or in the central bore 70, nor is there any positive or superatmospheric pressure on the lubricant which fills the enlarged bore 90 around the rod 120 and its associated insulation 122. In the absence of such superatmospheric pressure, the coil spring 110 biases the metallic electrical contact 112 and its associated diaphragm 113 toward the small diameter tubular portion 96 of the fitting 94 so that the metallic electrical contact 112 abuts against the metallic housing 98 of the fitting. An electrical circuit is thus made through the dashboard light 116, the wire 114, terminal block 106, spring 110, electrical contact 112, and the grounded small diameter tubular portion 96 of the fitting 94. When either the engine 10 or the auxiliary pump 24 are started, the pressure forcing lubricant to the lubricant gallery of the engine increases. The pressure of the lubricant in the enlarged bore 90 of the filter adapter 50 and also in the small diameter tubular portion 96 of the fitting 94 is also increased. This increase in the pressure exerted by the lubricant in these communicating spaces biases the flexible diaphragm 113 and the helical spring 110 toward the annular lip 100 of the housing 98 so that contact between the electrical contact 112 and the metallic portion of the fitting 94 is broken and the circuit made through the fitting 94 to ground is interrupted. The light 116 will thus be darkened, indicating to the automobile operator that lubricant is being delivered under pressure to the lubricant gallery of the engine via the central bore 70 of the filter adapter 50. By proper adjustment of the compressive force required to bias the spring 110 toward the lip 100 a sufficient distance to break the contact between the electrical contact 112 and the metallic housing 98 and fitting 94, the light 116 can be maintained in an energized or lighted status until a predetermined pressure of oil has been developed in the central bore 70 of the filter adapter 50 and therefore at the parts of the engine which are to be lubricated. An operator can thus be informed of the time at which a sufficient magnitude of pressure in the lubricant delivered to the moving parts of the engine has been reached to permit him to safely accelerate the engine without fear of damage resulting from inadequate lubrication.

Over extended periods of operation of the engine 10, the filter element 86 of the filter 20 will become clogged or blocked as a result of its continued function in straining undesirable impurities and deleterious materials from the lubricant. As the porosity of the filter element 86 decreases, the pressure drop across the element will increase resulting in a greater differential pressure between the lubricant in the ports 72 and the lubricant in the central bore 70. The increase in pressure differential across the filter element 86 will also be reflected by an increase in the difference in pressure which exists in the lubricant in passageway 76 as compared to the lubricant in passageway 78. Thus, as the filter becomes clogged by continued usage, a relatively higher pressure will be built up in the passageway 76 and in the counterbore 92 than the pressure of the lubricant in the passageway 78 and enlarged bore 90.

When the pressure differential between lubricant in the counterbore 92 and enlarged bore 90 becomes sufficiently great, the free-floating piston 130 will be caused to move toward the elongated metallic rod 120 or, stated differently, toward the right as viewed in FIGURE 2. Continued movement of the piston 130 toward the metallic rod 120 ultimately brings the piston into contact with the rod and causes the rod to be driven or pushed in an axial direction toward the electrical contact 112. At some predetermined pressure differential between the pressure of the lubricant in the counterbore 92 as compared to the pressure of the lubricant in the enlarged bore 90, the piston 130 will be driven sufficiently far to the right to compress the helical spring 126 and move the metallic rod 120 to a point at which one end of this rod contacts the electrical contact 112 while the other end of the rod is in contact with the piston 130. At this time, an electrical circuit is established through the light 116, electrical contact 112, the metallic rod 120 and the piston 130 to the metallic body of the filter adapter 50. Since the fitting 94 is threaded into the filter adapter 50, an electrical circuit is completed through the fitting 94 to ground. Thus, the light 116 will be illuminated to provide an indication of the fact that the filter element 86 has become clogged to the point where the lubricant is not passing freely therethrough, and that the filter 20 should be replaced or the filter element 86 cleaned.

Although the compound pressure switch assembly has been described as it is used for the purpose of illuminating a warning light such as the light 116 shown in FIGURE 2, this switch assembly may alternatively or simultaneously be used for closing an electrical circuit to certain control devices, such as a solenoid valve in a lubricant by-pass conduit (not shown) for permitting lubricant to by-pass the filter 20 to assure that the engine will receive a sufficient amount of lubricant until such time as the operator can conveniently stop the vehicle and change the filter, or any other suitable type of control device or warning system which can be operated by electrical circuitry closed by the operation of the described switch assembly.

From the foregoing description of the invention, it will be perceived that the present invention provides a novel and highly useful lubrication system for an internal combustion engine. A single filter is employed for filtering lubricant delivered to the engine by the auxiliary pump used for pre-lubrication, as well as by the main pump driven by the engine when it is in operation. The novel filter adapter which is utilized permits the filters now provided as original equipment on automobile gasoline engines to be utilized without change, and using the existing fittings provided for the filter on the internal combustion engine. The adapter also permits convenient signalling or information conveying pressure devices to be connected to the filter. The system is further believed to be characterized by the highly advantageous novel feature of providing a drain plug positioned downstream from the auxiliary pump used in pre-lubrication so that the engine can be completely drained of oil without the delay and inconvenience associated with standard gravity drainage systems.

Although certain preferred embodiments of the invention have been hereinbefore described in detail, it will be appreciated that various modifications and innovations can be made in the described embodiments without departure from the basic principles and concepts which underlie the invention. Insofar, therefore, as changes in the structure and arrangement described are undertaken by those practicing the basic principles of the invention, such changes and modifications are deemed to be circumscribed by the spirit and scope of the invention except as the same may be limited by the accompanying claims or reasonable equivalents thereof.

1. In combination with an internal combustion engine of a type having a lubricant sump and a pump driven by the engine for supplying lubricant to certain moving parts of the engine, the improvement which comprises:
    an auxiliary pump connected to said sump for drawing lubricant therefrom;
    an electric motor drivingly connected to said auxiliary pump;
    a source of electrical current electrically connected to said motor;
    a filter positioned externally of the lubricant sump connected to said engine driven pump and to said auxiliary motor driven pump for receiving lubricant from either of said pumps;
    means for conveying lubricant from said filter to said moving parts.

2. The combination claimed in claim 1 and further characterized to include a conduit connected between said filter and said auxiliary pump; and
    lubricant drainage means in said conduit for permitting lubricant to be pumped by said auxiliary pump through said conduit to drainage.

3. The combination claimed in claim 1 and further characterized to include means for indicating the pressure drop across said filter.

4. A lubrication system for an internal combustion engine comprising:
    a main pump driven by said engine for delivering lubricant to certain moving parts of said engine when the engine is running;
    an auxiliary pump;
    a lubricant manifold in said engine for receiving lubricant from said main pump;
    an engine block passageway in the engine adjacent said lubricant manifold for conveying lubricant toward the parts of the engine to be lubricated;
    a filter adapter connected to said engine adjacent said manifold and having at least one port communicating with said manifold for receiving lubricant therefrom and having a bore communicating with said engine block passageway;
    a filter connected to said filter adapter and including two spaces separated by a filter element, one of said spaces communicating with the bore of said filter adapter and the other of said spaces communicating with said port;
    an auxiliary pump connected to the port of said filter adapter for conveying lubricant to said filter via said filter adapter; and
    driving means drivingly connected to said auxiliary pump and driving said auxiliary pump independently of the operation of said engine for lubricating the engine prior to the time the engine is started.

5. The combination claimed in claim 4 and further characterized to include signal means connected to said filter adapter for developing a signal indicative of the pressure differential across said port and said bore as lubricant flows therethrough.

6. A lubrication system as claimed in claim 4 wherein said auxiliary pump is connected to said engine for receiving used lubricant therefrom; and further characterized to include:
    drain means connected between said auxiliary pump and said filter adapter for draining lubricant from said engine using said auxiliary pump.

7. A lubrication system as claimed in claim 5 wherein said signal means comprises a compound differential pressure switch connected to said bore and said port responsive to variations in the pressure of lubricant flowing in said bore and port, said switch including a fitting containing a first pressure responsive element responsive to variations in the pressure of lubricant in said bore for making and breaking an electrical circuit, and said switch further including movable means continuously responsive to changes in the pressure differential between lubricant in said port and said bore for making said electrical circuit when said pressure differential exceeds a predetermined magnitude.

8. In an internal combustion engine of the general type having a lubrication system which includes a lubricant sump, a lubricant gallery in the block of the engine for distributing lubricant to moving parts of the engine, means for securing a lubricant filter to the outside of the block of the engine, a lubricant pump in the engine and driven thereby for pumping lubricant from said sump to said moving parts, a first passageway means in said engine for conveying lubricant from said pump to said filter, and second passageway means in said engine for conveying lubricant from said filter to said lubricant gallery, the improvement which comprises:
    a filter adapter secured to said engine block by said filter securing means and having spaced openings extending therethrough with at least one of said openings communicating with said first passageway means and another of said openings communicating with said second passageway means;
    a lubricant filter detachably secured to said filter adapter and spaced from said engine block, said lubricant filter including a hollow housing and a filter element partitioning said hollow housing into two spaces, one of said spaces communicating with said openings in said filter adapter which communicate with said first passageway means, and the other of said spaces communicating with the openings in said filter adapter which communicate with said second passageway means; and
    means attached to said filter adapter for indicating the differential pressure existing between lubricant in the openings of said filter adapter communicating with said first passageway means and in said openings of said filter adapter communicating with said second passageway means whereby the state of cleanliness of said filter element can be known by observing said indicated differential pressure.

9. Filter adapter apparatus for use in gasoline driven internal combustion engines of the type used in automobiles and including an engine block, fittings on said block for attaching a lubricant filter thereto, and a lubricant filter of the type having a housing and further having a filter element in said housing partitioning the housing into two spaces, said filter adapter apparatus comprising:
   means cooperating with said fittings for attaching said filter adapter apparatus to said block where said filter is normally attached;
   means for detachably securing said filter to said filter adapter apparatus and in spaced relation to said block;
   a metallic body having at least one port extending therethrough and adapted to communicate with one of the spaces of said filter when said filter is detachably secured to said filter adapter apparatus, and having a bore therethrough adapted to communicate with the other of the spaces of said filter when said filter is detachably secured to said filter adapter apparatus;
   a first pressure responsive switch means connected to said bore and responsive to changes in the pressure of lubricant in said bore for opening and closing an electrical circuit; and
   second pressure responsive switch means connected to said bore and said port and responsive to changes in the difference in pressure in the lubricant in said port and bore for opening and closing an electrical current.

10. A filter assembly for use on internal combustion engines of the type including an engine block and passageways in said engine block for circulating a lubricant to the moving parts of the engine, said assembly comprising:
   a filter including:
      a housing; and
      a filter element in said housing partitioning the housing into two spaces; and
   a filter adapter comprising:
      a central rigid body having at least one port extending therethrough and communicating with one of the spaces in said filter housing, and having a bore extending therethrough and communicating with the other of the spaces in said filter housing;
      means on said central body for securing said filter adapter to the engine block with said port and bore communicating with the passageways in said block;
      means on said central body detachably connecting said filter housing to said central body; and
      pressure responsive switch means connected to said port and bore for opening and closing an electrical circuit in response to changes in the difference in pressure of a fluid filling said port and bore.

11. A filter adapter apparatus for use in gasoline driven internal combustion engines of the type used in automobiles and including an engine block, fittings on said block for attaching a lubricant filter thereto, and a lubricant filter of the type having a housing and further having a filter element in said housing partitioning the housing into two spaces, said filter adapter apparatus comprising:
   attaching means adapted for cooperation with said fittings for attaching said filter adapter apparatus to said block where said filter is normally attached;
   means for detachably securing said filter to said filter adapter apparatus in spaced relation to said block;
   a body having at least one port extending therethrough and adapted to communicate with one of the spaces of said filter when said filter is detachably secured to said filter adapter apparatus, and having a bore therethrough adapted to communicate with the other of the spaces of said filter when said filter is detachably secured to said filter adapter apparatus; and
   pressure responsive means connected to said body and in operative communication with said port and bore for providing a visual signal indicative of the difference in pressure of said lubricant in said port and bore.

12. In combination with an internal combustion engine of the type having a lubricant sump and a pump driven by the engine for supplying lubricant to certain moving parts of the engine, the improvement which comprises:
   an auxiliary pump connected to said sump for drawing lubricant therefrom;
   an electric motor drivingly connected to said auxiliary pump;
   a source of electrical current electrically connected to said motor;
   a filter connected to said engine driven pump and to said auxiliary motor driven pump for receiving lubricant from either of said pumps;
   means for conveying lubricant from said filter to said moving parts;
   a filter adapter for detachably securing said filter to said engine, said filter adapter having a first passageway means therein for conveying lubricant from said auxiliary pump to said filter and second passageway means therein for receiving lubricant from said filter after its passage therethrough; and
   a lubricant actuated, pressure differential electrical switch connected across said passageway means and responsive to changes in the difference in the pressure of lubricant in said first and second passageway means for closing an electrical circuit.

References Cited by the Examiner
UNITED STATES PATENTS

| | | | |
|---|---|---|---|
| 2,102,514 | 12/1937 | Clarkson | 123—196 |
| 2,110,662 | 3/1938 | Fisher | 123—196 |
| 2,273,888 | 2/1942 | Paulsen | 123—196 |
| 2,691,429 | 10/1954 | Kovacs | 184—6 |
| 2,838,039 | 6/1958 | Smith et al. | 123—196 |
| 3,087,582 | 4/1963 | Potter | 184—6 |

LAVERNE D. GEIGER, *Primary Examiner.*

H. BELL, *Assistant Examiner.*